(12) United States Patent
Diesel et al.

(10) Patent No.: US 11,197,362 B2
(45) Date of Patent: Dec. 7, 2021

(54) VIRTUAL THREE-WAY SWITCH, SYSTEMS AND METHODS

(71) Applicant: 1Switch, LLC, Saugus, MA (US)

(72) Inventors: Michael E. Diesel, Saugus, MA (US); Nicholas D. Moats, Saint Marys, KS (US)

( * ) Notice: Subject to any disclaimer, the term of this patent is extended or adjusted under 35 U.S.C. 154(b) by 0 days.

(21) Appl. No.: 16/951,964

(22) Filed: Nov. 18, 2020

(65) Prior Publication Data

US 2021/0212185 A1 Jul. 8, 2021

Related U.S. Application Data

(60) Provisional application No. 62/958,678, filed on Jan. 8, 2020.

(51) Int. Cl.
| | |
|---|---|
| *H05B 47/19* | (2020.01) |
| *H05B 39/06* | (2006.01) |
| *H01H 9/54* | (2006.01) |
| *H02J 13/00* | (2006.01) |

(52) U.S. Cl.
CPC ............... *H05B 47/19* (2020.01); *H01H 9/54* (2013.01); *H05B 39/06* (2013.01); *H02J 13/00024* (2020.01)

(58) Field of Classification Search
CPC ...... H05B 47/19; H05B 39/06; H05B 47/105; H01H 9/54; H02J 13/00024
See application file for complete search history.

(56) References Cited

U.S. PATENT DOCUMENTS

| | | | |
|---|---|---|---|
| 7,758,234 B1* | 7/2010 | Savicki, Jr. | H01R 13/7175 362/641 |
| 2002/0050799 A1* | 5/2002 | Yamauchi | H05B 47/175 315/307 |
| 2006/0125649 A1* | 6/2006 | Ostrovsky | H05B 39/086 340/635 |
| 2009/0058193 A1* | 3/2009 | Reid | H05B 47/115 307/116 |
| 2014/0265881 A1* | 9/2014 | Karc | H05B 47/19 315/158 |
| 2014/0265918 A1* | 9/2014 | Cummings | H05B 47/19 315/292 |
| 2015/0357133 A1* | 12/2015 | Keirstead | H01H 23/04 200/339 |

(Continued)

*Primary Examiner* — Renan Luque
(74) *Attorney, Agent, or Firm* — Sagacity Legal, PLLC (57) ABSTRACT

A system may be provided that includes an adaptor connected to a dimmer and virtual three-way switch. The virtual three-way switch can be for a lamp plugged into wall-switched receptacle. The virtual three-way switch can control a lamp, appliance, or any device that is connected to the three-way switch by one or more of the connected switches, independent of the position of the unused switch. The virtual three-way switch may include a power input that receives power from a first power source, a sensor detecting a state change of a second power source, a user input sensor receiving a user command, and a power output delivering received power at a rate as function of the state change and of the user command. The virtual three-way switch can be connected to a user input device that is waiting to receive a command. The power output can deliver power to a connected device.

20 Claims, 9 Drawing Sheets

(56) References Cited

U.S. PATENT DOCUMENTS

| | | | |
|---|---|---|---|
| 2015/0382436 A1* | 12/2015 | Kelly | G08C 17/02 |
| | | | 315/131 |
| 2017/0023963 A1* | 1/2017 | Davis | H04W 48/16 |
| 2019/0221958 A1* | 7/2019 | Karc | H02G 3/08 |

* cited by examiner

```
First_time = true;                              // Used to signal initialization. Then false forever
bool Red;                                       // Wall switch–excludes external signal
bool Red_state;                                 // One cycle delay of Red
Bool Touching = false;                          // User is touching the pad. Requires a relay sensor?
Bool Touching_state = false;                    // One cycle delay of touching
Bool Dim_by_touch;                              // Dip switch #1 position
Bool Dim_by_wall_switch;                        // Dip switch #2 position
Bool Delay;                                     // One cycle delay for setting low level signal
Bool Other_low;                                 // Some other unit is not at max
long Lamp_counter;                              // Initialize off. This sets light level void Set_Signal (bool low)    {                 // Put signal on red wire if allowed
  If (!Red) Set_Signal_Voltage(low);            // true = we are low; false = we are full
}
void ChangeLamp (bool dim_from_here) {
  If (dim_from_here)    {
    If (++Lamp_counter > 3)   Lamp_counter = 0; // Wrap around from 3 to 0
  } else   {                                    // No dimming; just on/off
    If (Lamp_counter == 0) Lamp_counter = 3;    // Turn lamp full on if off
    Else Lamp_counter = 0;                      // Otherwise, turn it off
  }
  Set_Light_Level(Lamp_counter);                // Set light voltage TBD
}

Void Execute (int) {                            // Executes at a periodic rate TBD
  Bool Delay = false;                           // Local—no signal delay needed yet
  If (first_time)   {                           // Rebooting?
    Red_state = Red;                            // Yes. Save current state
    Lamp_counter = 0;                           // Start lamp as off
    Touching_state = Touching;                  // User might be touching pad. Do nothing for now
    First_time = false;                         // This only gets done once
  }
  Other_low = Read_Status();                    // Figure out whether other units low TBD
  If (!Touching)   Touching_state = false;      // User not touching pad
  Else if (!Touching_state)     {               // User has just started touching the pad
    ChangeLamp(Dim_by_touch);                   // Change lamp state as appropriate
    Touching_state = true;                      // But only once per touch
  }
  If (Red != Red_state)    {                    // Light switch toggled
    If (Lamp_counter !=3 or !Other_low)   {     // Toggle light, except wait if we are max and other(s) are not max,
      ChangeLamp(Dim_by_wall_switch);
      If (Lamp_counter == 3)     Delay = true;  // Delay if we just went full on
    }
    Red_state = Red;                            // Update for next time through
  }
  If (!delay)  {
    If (Lamp_counter == 3)    Set_Signal(false); // Tell others we are full on
    Else Set_Signal(true);                       // Tell others we are low or off
  }
```

VIRTUAL THREE-WAY SWITCH, SYSTEMS AND METHODS

RELATED APPLICATION(S)

This application claims the benefit of U.S. Provisional Application No. 62/958,678, filed on Jan. 8, 2020. The entire teachings of the above application is incorporated herein by reference.

BACKGROUND

Multiway switching is the interconnection of two or more electrical switches to control an electrical load (often, but not always, lighting) from more than one location. This allows, for instance, lighting to be controlled from multiple locations.

In three-way and four-way switches, the controlled load is often a lamp, as well as other electrical loads, such as an outlet, chargers, or any other appliances. The electrical load may be plugged into a switched receptacle or be permanently hard-wired.

Three-way and four-way switches make it possible to control a light from multiple locations, e.g. the top and bottom of a stairway, both ends of a long hallway, or multiple doorways into a room. Such switches appear externally similar to single pole, single throw (SPST) switches, but have extra connections which allow a circuit to be controlled from multiple locations. Toggling the switch disconnects one "traveler" terminal and connects the other. A convention "3-way" switch is a single pole, double throw (SPDT) switch. By correctly connecting two of these switches together, toggling either switch changes the state of the load from off to on, or vice versa. The switches may be arranged so that they are in the same state for off, and differing states for on. A "4-way" (intermediate) switch is a special-purpose, double pole, double throw (DPDT) switch. It is internally wired to reverse the connections between the input and output and having only four external terminals.

SUMMARY

While three-way and four-way switches make it possible to control the state of the load from multiple locations, problems remain. Rooms are often built with a wall switch near the room entrance. The switch typically controls a receptacle of one or more of the split wall outlets in the room. Consider, for example, a lamp on a nightstand that is plugged into such a switchable receptacle. The user can control that lamp from the wall switch by the door. However, if the user turns off that nightstand lamp via its internal switch, the user typically can no longer turn on that lamp from the wall switch. Instead, the user relies on the table lamp to turn it on via its internal switch. Conversely, if the user turns off the wall switch, she cannot turn on the table lamp with its internal switch, but rather must move to the wall switch to operate it.

Conventional attempts to solve such problems mentioned above are typically impractical, inefficient or not user friendly. Such attempts often rely on clumsy gadgets, radio signals or the requirement that users must leave the lamp and wall switches in the ON position, except when they quickly cycle them to signal their intention to change the state of the lamp.

The present disclosure addresses such problems. In some example solutions, a device is provided that causes a wall switch and a touchpad each to behave as a VIRTUAL three-way switch. In one embodiment, the device may be implemented as an electrical adapter that ensures that a connected device receives power. The power may be transmitted to the connected device independent of the position of any wall switch.

In an embodiment, the device/electrical adaptor interfaces with a dimmer and a virtual three-way switch for a lamp plugged into wall-switched receptacle. The device/adaptor controls power to a connected device via a virtual three-way switch by one or more of the connected switches, independent of the position of the unused switch. Connected devices may be turned off/on by toggling a switch, by touching the lamp, or via a user command received at a user input sensor of the adaptor from an input/output device. Input/output devices may include touchpad (e.g. touch screen interface), keyboard, mouse, speaker, audio input and output, video input and output, microphone jack, etc.)

In an embodiment, the device/electrical adaptor includes a power input that receives power from a first power source, and a state-change sensor detecting a state change of a second power source. The adaptor may include a user input sensor that is waiting to receive a user command from a user input device. The adaptor further may include a variable power output that is configured to deliver received power at a rate as a function of the state change of the second power source and of the user command.

In an embodiment, the device/electrical adaptor changes the rate at which the received power is delivered by the variable power output based upon either the state change detected by the sensor or the user command received at the user input sensor. The change may be made by a controller in the device/electrical adaptor that responds to the state change and or the user command. The electrical adaptor may further include switches, such as an array of at least three DIP switches, one first switch that permits the controller to change the rate of the received power (i.e. dimming) to a rate between no power and full power based only on the user command received at the user input sensor; a second switch that permits the controller to change the rate of the received power to a rate between no power and full power based on the state change detected by the state-change sensor; and a third switch that indicating that multiple device/electrical adapters are detecting the same state-change, which does not permit the received power to be delivered by the variable power output.

In one example, the change is in voltage. In another, the change is pulse-width modulation to dim a lamp.

In an embodiment, the device/electrical adaptor includes at least one USB charger port configured to deliver the received power to attached USB devices.

The device/adaptor may include at least one hot output that delivers the received power to additional connected devices independent of the rate at which the received power is delivered by the variable power output.

A cord may be provided for convenience to transport the received power from the power input a separate fixed power output.

The first power source may be an always-on wall receptacle, and the second power source may be a variable (switched) wall receptacle controlled by a wall switch. The rate at which the received power is delivered to the variable power output may be responsive to the user command received by the user input sensor even when power to the wall receptacle has been turned off by the wall switch.

A user input device may be provided to communicate user commands from a user in order to control a connected device that is connected to the device/electrical adaptor. The user input sensor described above may be configured to receive the user command from the user input device. In one embodiment, the user input device is a touchpad in communication with the device/adaptor via the user input sensor of the device/adaptor. The user input sensor can receive the user command when a user touches a connected device that is connected to the variable power output, i.e., the user touches a metal part of the lamp. In other embodiments, the user input device may be adapted to receive an audio command from a user, and the user input sensor receives the user command from the user input device in the form of an electrical signal. In another example, the user input device may be adapted to receive an RF command from the user. The user input device may be adapted to communicate with the device/adaptor and any user device via a Wi-Fi connection. In still other embodiments, the user input sensor in the device/electrical adaptor may be an audio, RF, or Wi-Fi sensor.

In an embodiment, the adaptor has a circuit that is designed to control power commands to a lighting device via a split electrical wall outlet. The circuit may be adapted to receive input from a user via an input device for the user to control the lighting device. A surge protector may be provided.

The rate at which the received power is delivered by the variable power output may be either no power or full power.

The electrical adaptor may further include an always-on power output that is configured to deliver the received power independent of the state change of the second power source and independent of the user command.

In an embodiment, a system is provided to solve the problems described above. A first electrical adaptor is attached to a first wall receptacle with a variable receptacle controlled by a switch. A second electrical adaptor is attached to a second wall receptacle with a variable receptacle controlled by the switch. A first appliance is connected to the first adaptor controllable by the switch and the device of the first adaptor. A second appliance is connected to the second adaptor controllable by the switch and the device of the second adaptor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4 is an example of a C++ program running in an example embodiment of the present invention.

DETAILED DESCRIPTION

A description of example embodiments follows.

Embodiments of the present disclosure include systems, methods, and devices that provide transforms a SPST wall switch and a touchpad each into virtual 3-way switches.

System Architecture

Figure 1:
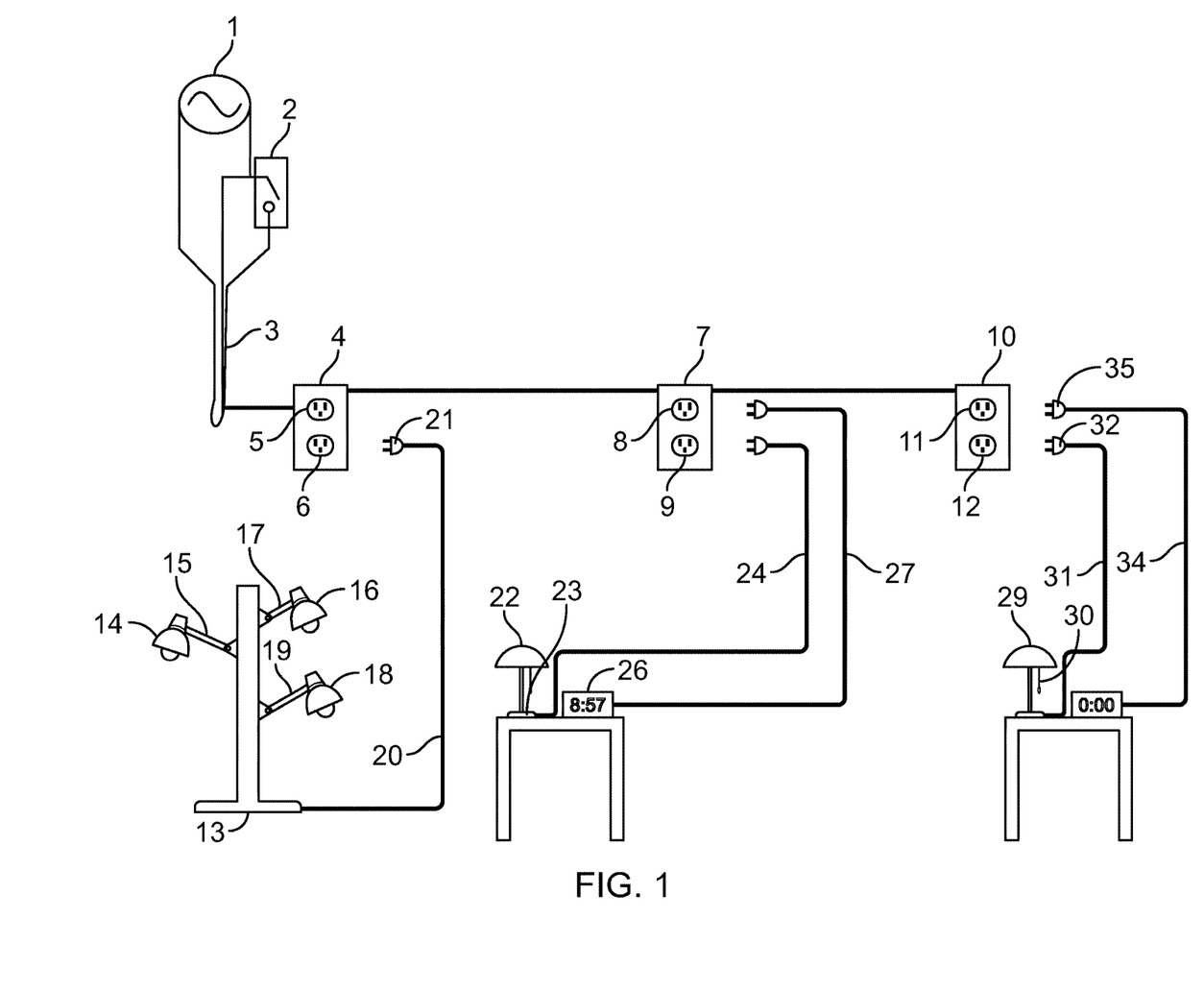
FIG. 1 is a schematic of a room containing three outlets, each outlet connected to one of three devices without an example embodiment of the present invention.

FIG. 1 is a schematic of a room containing three outlets 4, 7, 10, each outlet connected to one of three devices 13, 22, 29 without an example embodiment of the present invention. FIG. 1 illustrates the existing deficiencies of the prior art when of switching lighting in a room (e.g. a bedroom) that may have no overhead light, but rather a wall switch 2 that controls the electrical power delivered to the bottom receptacles 6, 9, 12 of split electrical outlets 4, 7, 10 in the room. Outlets 4, 7, 10 are connected to each other, the AC power supply 1 and the wall switch 2, via grounded 14-3 electrical wire 3. In alternative embodiments Outlets 4, 7, 10 may be connected to each other, the AC power supply 1 and the wall switch 2, via any know type of electrical wiring. The top receptacles 5, 8, 11 of electrical outlets 4, 7, 10 in the room are always powered. The power state of bottom receptacles 6, 9, 12 of electrical outlets 4, 7, 10 are controlled by wall switch 2. The room may have any number of outlets 4, 7, 10 connected to any number of switches 2. Alternately, instead of the single switch shown in FIG. 1, there could be two three-way switches and any number of 4-way switches.

Lighting device 13 has three separately switchable lamps 14, 16, 18 that each have rotary switches 15, 17, 19. 13 has cord 20 with a plug 21 that is plugged into the switched receptacle 6. The power state switchable lamps 14, 16, 18 is dependent upon the both position of wall switch 2 and the position of their individual switches 15, 17, 19.

Nightstand lamps 22 and 29 with switches 23 and 30 each have cords 24 and 31 with plugs 25 and 32 that are plugged into switched receptacles 9 and 12. The power state of Nightstand lamps 22 and 29 is dependent upon the both position of wall switch 2 and the position of their switches 23 and 30. For example Nightstand lamp 22 is powered only if wall switch 2 and its switch 23 are both on. Similarly, nightstand lamp 29 is powered only if wall switch 2 and its switch 30 are both on.

Clock 26 and Clock radio 33 each have cords 27 and 34 with plugs 28 and 35 that are plugged into always-hot receptacles 8 and 11. Therefore, Clock 26 and Clock radio 33 are not controlled by wall switch 2.

Alternatively, Pole lamp 13, Nightstand lamps 22 and 29, Clock 26. and Clock radio 33 can be any known electrical devices that can draw power from receptacles 5, 6, 8, 9, 11, 12 of outlets 4, 7, 10.

Nightstand lamps 22 and 29 and Lighting device 13 are separate devices and a user may want to operate them individually from each other, but their power states always rely, at least in part, on the same wall switch 2. This interdependence is not desired and limits a user's control over the Nightstand lamps 22 and 29 and Lighting device 13. If a user wishes to operate only one (or other subset) of the five devices 14, 16, 18, 22, 29, wall switch 2 must remain ON and the other devices, even if unused, can only be controlled by their individual device switches. Without the present invention, to retire for the night, a person has to walk around the room and manually turn off all three lamps 14, 16, 18 on the pole lamp 13 by rotating switches 15, 17 and 19. Then she would operate switch 23 to turn off nightstand lamp 22 located on the other side of her bed or elsewhere away from her side of the bed while leaving nightstand lamp 29 located next to her bed ON.

When she is finished reading, she would have to sit up to reach the pull switch 30 to turn off the nightstand lamp 29. For full lighting in the morning she has to walk around the room to operate all five switches 14, 16, 18, 23 and 30.

When she leaves the room, she can turn off all five lamps 14, 16, 18, 22, 29 by opening the wall switch 2 but all five lamps 14, 16, 18, 22, 29 will be unable to be turned on at their individual switches 14, 16, 18, 23 and 30 until switch 2 is closed. When she enters the room, she can turn on all five lamps 14, 16, 18, 22, 29 by closing the wall switch 2. However, opening wall switch 2 will turn on any device whose individual switch is not set to OFF, regardless of the desires of the user. The user cannot fully control any of the five lamps 14, 16, 18, 22, 29 using only their device specific switches without taking into account the position of wall switch 2. In fact, the user cannot control the five lamps 14, 16, 18, 22, 29 using their device specific switches in any manner if the wall switch 2 is positioned OFF.

Figure 2:
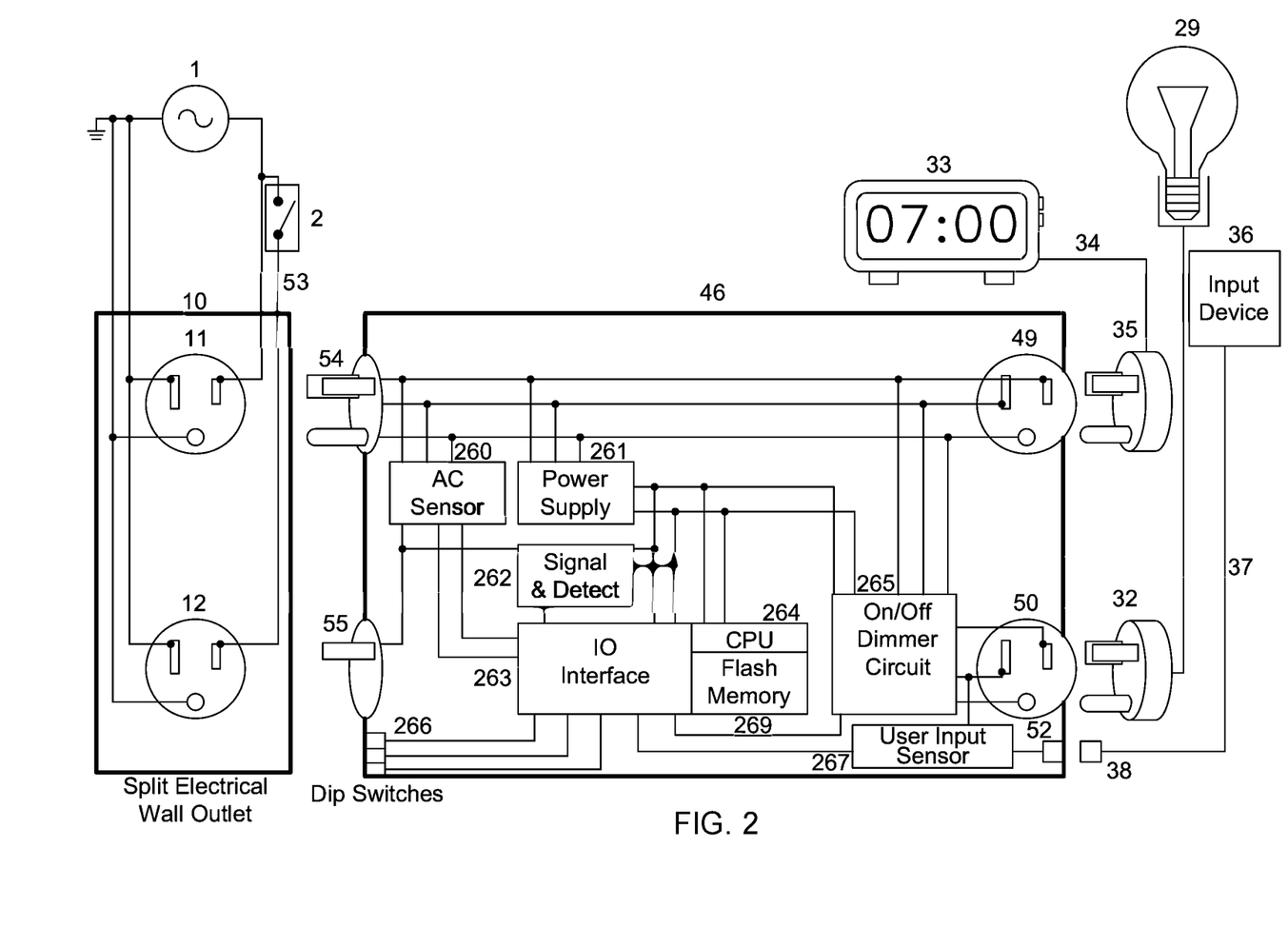
FIG. 2 is a circuit schematic of an example embodiment connecting a lighting device to a split electrical wall outlet, along with an input device for the user to control the lighting device.

FIG. 2 is a circuit schematic of an example embodiment device 46 connecting an example connected device, specifically a lighting device 29, to a split electrical wall outlet 10. Commercial power is delivered by the AC power supply 1 and is provided to split outlet 10, directly to receptacle 11, and, through a wall switch 2, to switched receptacle 12. The receptacle 11 is an example of a "first power source," as used herein, while the receptacle 12 is an example of a "second power source," as used herein. The position of wall switch 2 controls the flow of power to switched receptacle 12, such that the switched receptacle 12 constitutes a wall receptacle," as used herein.

Device 46 is an example embodiment of the invention with prongs 54 molded to plug into the always-hot receptacle 11 and sensor prong 55 molded to plug into the switched receptacle 12. The Device 46 is also referred to herein as an "adaptor" or "electrical adaptor." Device 46 itself includes a split outlet with an optional always-hot receptacle 49, as well as a variable receptacle 50. The variable receptacle 50 is an example of a "variable power output," as used herein. Device's 46 always-hot receptacle 49 continually draws power from outlet's 10 always-hot receptacle 11 via prongs 54. The prongs 54 are an example of a "power input," and the prongs 54 receive power from the first power source, namely receptacle 11. Device 46 alters the flow of power from outlet's 10 always-hot receptacle 11 to device's 46 variable receptacle 50. The user can connect a clock 33, or other device where a state change is not desirable, into always-hot and an optional input device 38 into jack 52. The input device may be any input/output device, such as a touch screen interface, keyboard, mouse, display, speaker, audio input and output, video input and output, microphone jack, etc.).

Device's 46 additional circuit components including AC sensor 260, Power supply 261, Signal and Detect 262, I/O interface 263, CPU 264, flash memory 269, On/Off Dimmer Circuit 265, Configuration switches 266, and User Input Sensor 267, all of which work together to control the flow of power to device's 46 switched receptacle 50. Power Supply 261 provides power to the I/O interface 263, CPU 264, flash memory 269, and On/Off Dimmer Circuit 265. AC sensor 260 is an example of a "state-change sensor," as used herein. AC sensor 260 detects a state change in outlet's 10 switched receptacle 12 induced by a user changing the setting of switch 2.

A representative user input device 36 is also illustrated in FIG. 2, generally representing input means by which a user may provide a user command in a wide variety of specific ways. For example, the input device 36 may be a metallic part of the lamp 29. User input Sensor 267 may detect the user touching a metallic part of lamp 29, and the user input sensor may thus receive the user command, which may be treated as a dimming command or on/off command, for example. Alternatively, the input device 36 may be a touch pad or any one of many other modules that can be separate from the lamp 29. In similar manner, a user command may be provided by the touch pad or other module, to the device 46, via the user input sensor 267 receiving the user command. User input device 36 may be connected to device/adaptor 46 at port 52 by cord 37 and plug 38. Alternatively, input device 36 may be connected to device 46 wirelessly by a z-wave or zigby chip or other wireless communication method. In still other examples, the input device 36 and user input sensor 267 form part of a common component within the device 46 and may receive a user command in the form of an audio command, Wi-Fi signal, RF signal, or the like.

Programs stored in flash memory 269 are executed by CPU 264. These programs may cause device 46 to alter the power state of device's 46 variable receptacle 50 through the On/Off Dimmer Circuit 265. These alterations of the power state of variable power output receptacle 50 are made based upon both a change in voltage detected by AC sensors 260 induced by the change in position of wall switch 2 and by signals received from the user through input device sensor 36. In other words, the variable power output may deliver power received from the power input, at a rate, as a function of the state change of the second power source and of the user command. The user command signals may be received by the user input sensor 267 of the device 46, from the user input device 36, in response to a user touching a metallic part of lamp 29 or touching a button or touchpad, such as touchpad 38, attached to input device 36. The programs allow a user to use device 46 to control a device plugged into variable receptacle 50 by changing the position of wall switch 2 or by issuing a command to input device 36.

The "rate" described above may be full power (e.g., implemented by provided full AC voltage or current from the power input 54 to the variable power output 50), no power, or an intermediate power value that provides a dimming setting for the lamp 29, for example. In the example of FIG. 2, the on/off dimmer circuit 265 provides this function. The circuit 265 receives power from the power input 54 and provides power to the variable power output receptacle 50, the power rate depending on instructions received through from the I/O interface 263. In turn, the instructions received from the I/O interface 263 are determined by the program running in CPU 264, information from the state-change AC sensors 260, and information from the user input sensor 267.

Because device's 46 variable receptacle 50 ultimately draws its power from outlet's 10 always-hot receptacle 11, its operation is not limited by the position of wall switch 2, and it can be fully controlled locally at input device 36. Moreover, since AC sensors 260 detect the change in voltage created by moving wall switch 2, device's 46 variable receptacle 50 can be also be controlled with wall switch 2. However, anything attached to device's 46 always-hot receptacle 49, such as clock 33, will remain powered independent of wall switch 2 and input device 36.

The program may send and receive signals to other devices 46 through Signal and Detect 262 and red wall wire 53 so that all lights controlled by devices 46 can be extinguished together from wall switch 2. (In this particular embodiment, this communication and the special logic in the program enables wall switch 2 to become a virtual three-way switch. Otherwise in this embodiment, each time the wall switch 2 was moved, one lamp might turn on while another lamp turns off, in an endless cycle.)

As will be understood in view of the drawings and description, the example device/adapter 46 be, in shape and outward appearance, similar to known, three-prong electrical adaptors. With the two sets of electrical prongs 54 and 55, the device 46 may conveniently plug into a standard wall outlet such as the split electrical wall outlet 10 illustrated in FIG. 2. Further, on the output side, the example device 46 includes output electrical receptacles 49 and 50, such that it may appear similar to known electrical adapters. However, because of the internal configuration of device 46 as described above, significant advantages are provided over known adapter devices, such that the device 46 functions as a virtual three-way switch. Further, as will be understood in view of the drawings and description, other embodiment devices may include any number of always-on power output receptacles like the receptacle 49, as well as any number of variable power output receptacles like the receptacle 50. Furthermore, in view of this disclosure, the principles described herein may be advantageously applied in embodiments that do not include three-prong connectors, but instead include connector configurations that are standard in any location in the world.

Figure 3:
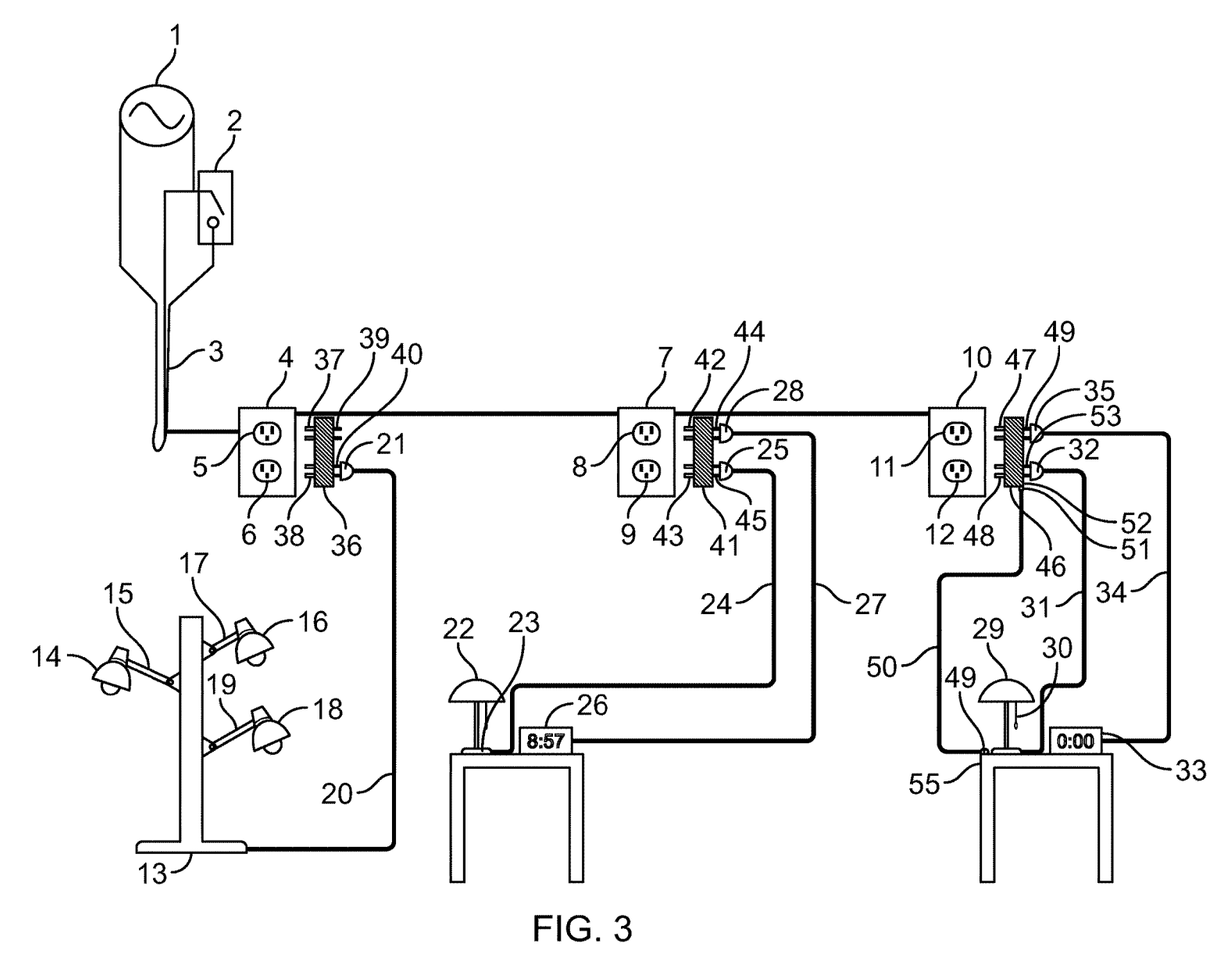
FIG. 3 is a schematic of a room containing three outlets, each outlet connected to one of three devices by an example embodiment of the present invention.

FIG. 3 is a schematic diagram illustrating the implantation of an example embodiment of a three-way virtual switch into the system described in relation to FIG. 1. Devices 36, 41 and 46 (all similar to the device 46 detailed in FIG. 2) are plugged into Outlets 4, 7 and 10. Each device derives power through plugs 37, 42 and 47 from the always-hot wall receptacles 5, 8 and 11. Each device monitors the status of its switched receptacle 6, 9 and 12 via a single sensor prong 38, 43 and 48 plugged into one hole of switched wall receptacle 6, 9, and 12, respectively.

Clock 26 and radio 33, which are examples of a "first appliance" and a "second appliance," respectively, as used herein, are connected to plugs 28 and 35 by wires 27, 34 and plugs 28 and 35, which are inserted into the top device receptacles 44, 49, which are always hot. Clock 26 and radio 33 may be replaced with any alternative electronic appliances based upon the requirements and purpose of the system.

Pole lamp 13 and nightstand lamps 22 and 29 are connected to plugs 21, 25 and 32 with cords 20, 24 and 31, which are inserted into switched device receptacles 40, 45 and 50.

To turn off each lamp 14, 16, 18, 22, 29 connected to switched device receptacles 40, 45 and 50 a user can merely move wall switch 2. Each device 36, 41, 46 would independently sense the change in voltage through sensor prongs 38, 43, 48 and cease all power to switched device receptacles 40, 45 and 50 turning off each lamp 14, 16, 18, 22, 29. Optionally, certain dimmable lamps could be dimmed, perhaps over 15 seconds. To turn on only lamp 29, the user would touch a metal part of it, or touch the furnished touchpad 49 which is connected to device 46 by wire 50, plug 51 and jack 52.

The user can then touch pad 49 to extinguish nightstand only lamp 29.

To turn on each lamp 14, 16, 18, 22, 29 connected to switched device receptacles 40, 45 and 50 a user merely moves wall switch 2. Each device 36, 41, 46 independently senses the change in voltage through sensor prongs 38, 43, 48 and turns on power to switched device receptacles 40, 45 and 50 turning on its respective lamp 36, 41, 46.

A user can turn off each lamp 14, 16, 18, 22, 29 connected to switched device receptacles 40, 45 and 50 by moving the wall switch 2. Each of our devices 36, 41, 46 would independently sense the change in voltage through prongs 38, 43, 48 and cease all power to switched device receptacles 40, 45 and 50, thus turning off each lamp 36, 41, 46.

Optionally, the user can configure device 46 so the lamp 29 goes through a dimming cycle of several steps when it or the touchpad 49 is touched and/or when wall switch 2 is moved. Configuration on dimming can be accomplished by the user sliding either or both of two DIP Switches 266 on the back of the device 46. In other embodiments, there may be other methods of configuration, as will be understood by those of skill in the art in view of this description.

If the Dim by Touch DIP switch 266 is set, each time the user touches lamp 29 or touchpad 49, the lamp moves one step in the dimming cycle. For example, the dimming cycle may include 0% (off), 33%, 67% and 100% full pulse width. As will be understood by those of skill in the art in view of this description, other embodiments may include other methods of dimming.

With appropriate setting of the Dim by Wall Switch DIP switch 266, each time the user moves switch 2, the lamp can move one step in the dimming cycle.

The user did not bother to connect touchpads to devices 36 and 41 because lamp 22 and pole lamp 13 are mostly metal and they need only to be touched to control them. When pole lamp 13 is touched, device 36 senses this and turns on (or off) all three included lamps, 14, 16 and 18.

A more complicated situation is when one of devices 36, 41 and 46 has its lamps off, one has its lights dimmed, and one has its light at full brightness. The example devices 36, 41 and 46 of FIGS. 2-3 can use the switched red wire 53 in the room wiring to communicate when their respective lamps are not 100% powered, i.e., they are off or dimmed. In the embodiments of FIGS. 2-3, this may be accomplished by applying a signal to switched AC line 53 during the time when the wall switch 2 is open. This signal could be a high frequency or a DC signal. Then, when wall switch 2 is moved, any lamp not fully bright moves a step closer to full brightness. Once all lamps controlled by devices 36, 41 and 46 are at full bright, moving wall switch 2 again turns them all off.

FIG. 4 shows example C++ instructions that can be processed in an example embodiment. For example, the instructions may be processed by device 46. In the particular example device 46, the instructions may be processed particularly by the CPU 264, for example. Nonetheless, and more broadly, these instructions may be implemented in a software, firmware, or hardware environment, as will be understood by those of skill in the art in view of this disclosure, in order to achieve the same virtual, three-way switching functions described hereinabove.

Another embodiment would be to have the devices 36, 41 and 46 signal to each other wirelessly.

Figure 7:
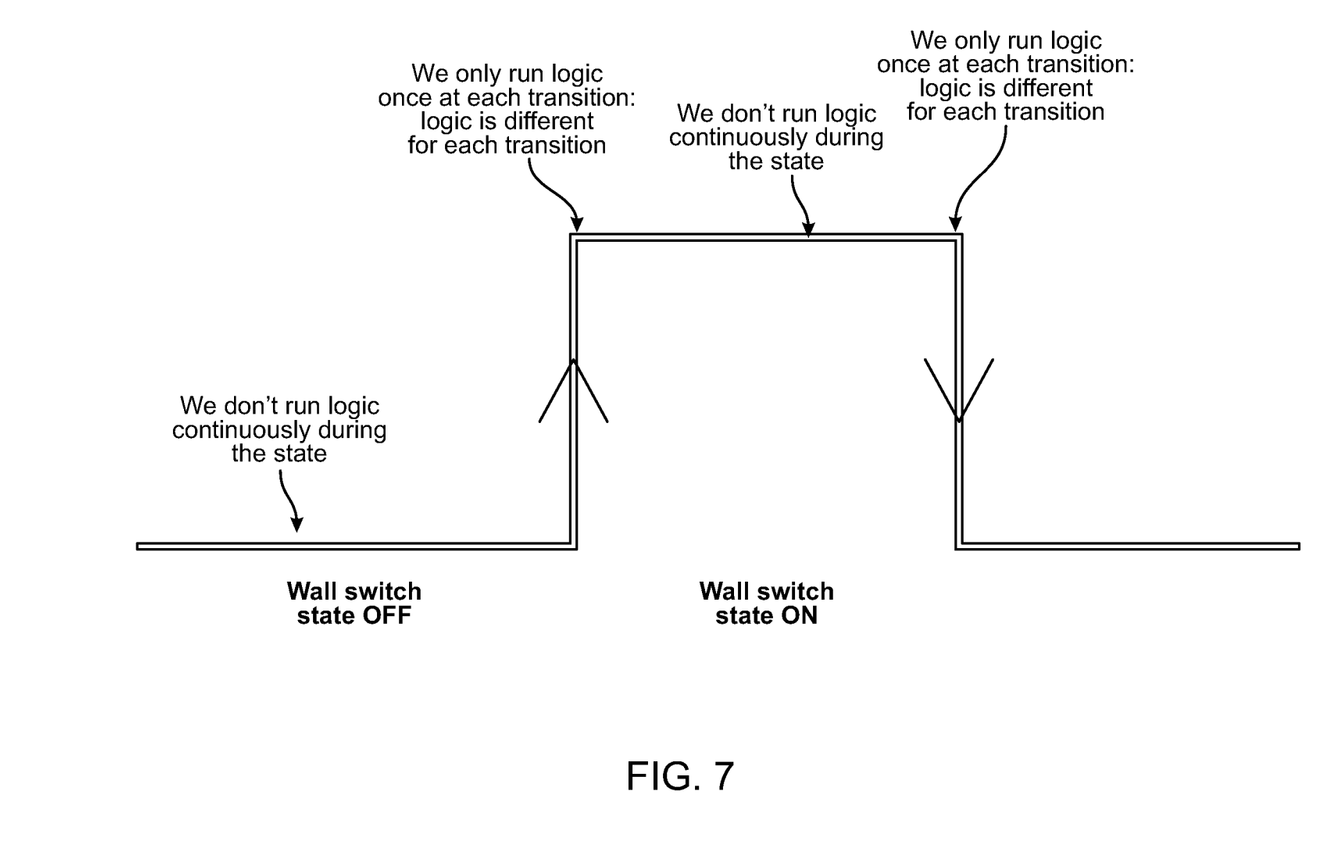
FIG. 7 is a state diagram showing on/off logic of a switching control system according to an embodiment of the invention.

Another embodiment would use no signaling, but rather would use a third configuration DIP switch DIP Switch 3: Multiple units present. With this switch set on all the devices 36,41, and 46, they would not allow Dim by wall switch. If the wall switch is moved a second time quickly, say within 500 ms, they will only turn their attached lamps off, not on. If multiple units are present, the wall switch becomes an on/off device. As depicted in FIG. 7, the wall switch will either turn all units on when in the "UP" position (120 VAC signal) or OFF when in the "DOWN" position (no 120 VAC signal). Any units with DIP Switch 3 can be controlled together upon a change in state of the wall switch.

Thus, moving the wall switch twice quickly extinguishes all lamps. Moving it again illuminates them all.

Processing Environment

In some embodiments, the adaptor/device 46 may process instructions implemented in a software, firmware, or hardware. These instructions may be implemented in a software, firmware, or hardware environment. FIG. 4 shows an example of such instructions in C++ code.

Figure 5A:
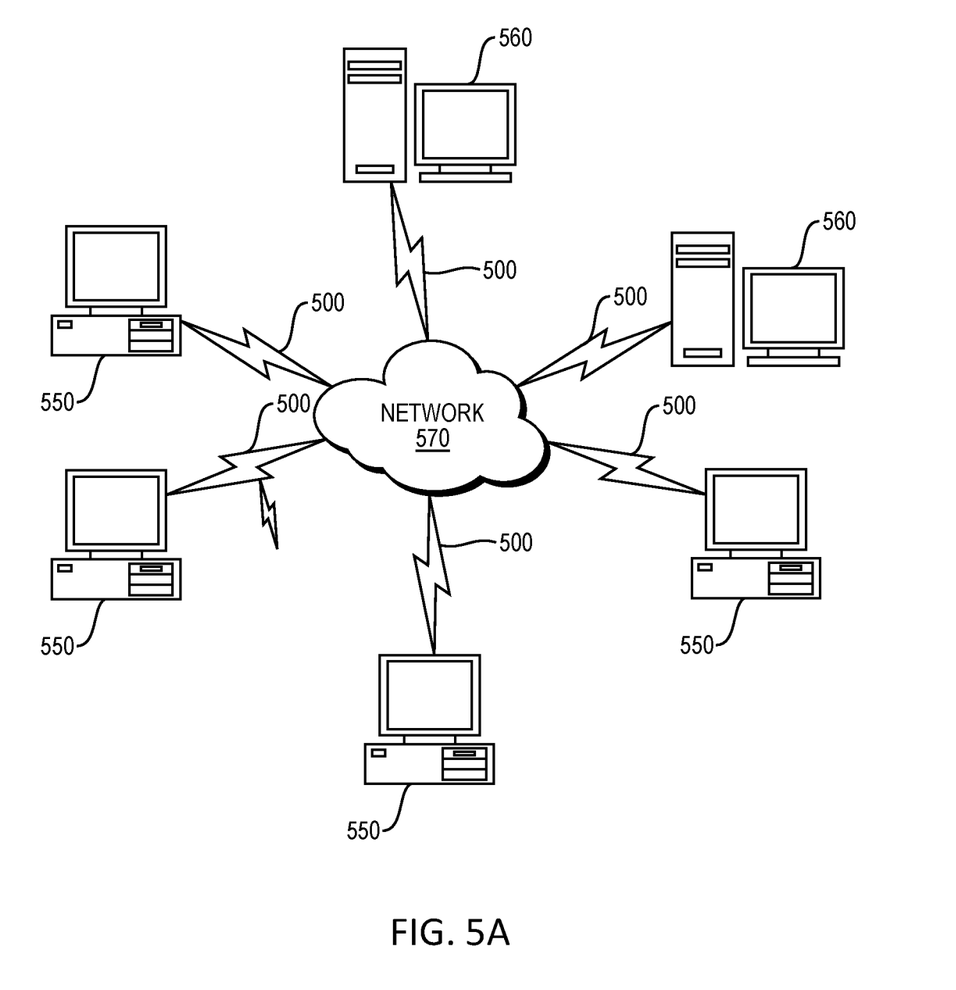
FIG. 5A is a block diagram of any internal structure of a computer/computing node.

FIG. 5A illustrates an example processing environment in which certain embodiments may be implemented. Client computers/devices 550 and server computers/devices 560 (or a cloud network 570) provide processing, storage, and input/output devices executing application programs and the like and can be used to interface with the adaptor/device 46 via a communication path 500.

Client computers/devices 550 may be linked directly or through communications network 570 to other computing devices, including other client computers/devices 550 and server computer/devices 560. For example, a client device 560 may interface with the adaptor/device 46 to be informed of the state of the adaptor/device 46 or of various input devices controlled thereby. Further, some embodiment devices are modified such that a client device 560 performs the processing functions of CPU 264 and Flash Memory 269 and runs the code described in connection with FIG. 4, for example.

The communication network 570 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another via communication paths 500. The communication network 570 may also be a virtual private network (VPN) or an out-of-band network or both. The communication network 570 may take a variety of forms, including, but not limited to, a data network, voice network (e.g. land-line, mobile, etc.), audio network, video network, satellite network, radio network, and pager network. Other electronic device/computer networks architectures are also suitable. Server computers 560 may be configured to provide cloud computing solutions including SAS solutions for interfacing with input devices 36 and client devices 550.

Figure 5B:
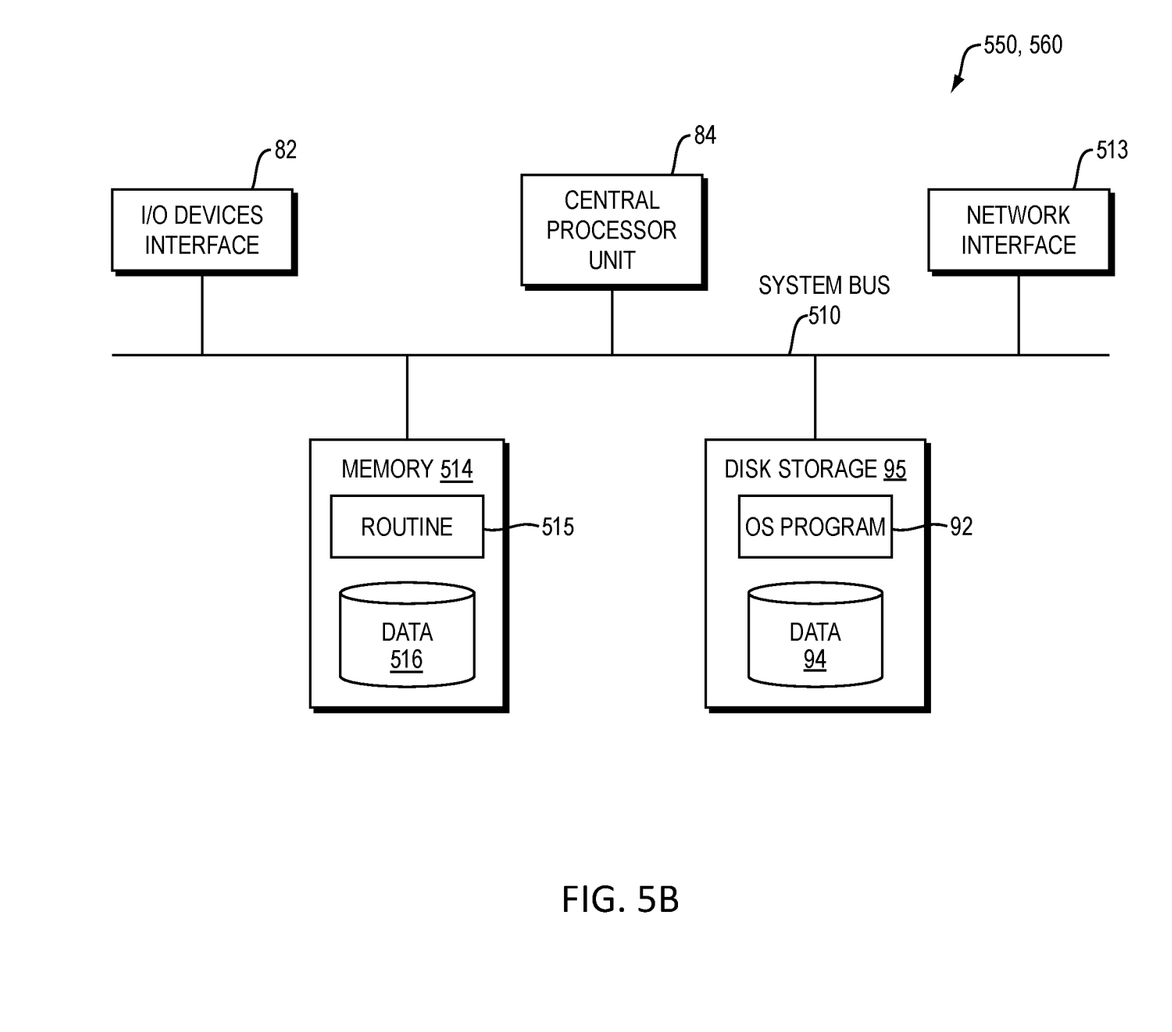
FIG. 5B is a block diagram showing an example three or more multiway switching control system according to an embodiment of the invention.

FIG. 5B is a block diagram of any internal structure of a computer/computing node (e.g., client processor/device 550 or server computers 560) in the processing environment of FIG. 5A, which may be used to facilitate displaying audio, image, video or data signal information. Each computer 550, 560 in FIG. 5B contains a system bus 510, where a bus is a set of actual or virtual hardware lines used for data transfer among the components of a computer or processing system.

The system bus 510 is essentially a shared conduit that connects different elements of a computer system (e.g., processor, disk storage, memory, input/output ports, etc.) that enables the transfer of data between elements.

Attached to the system bus 510 is an I/O device interface 511 for connecting various input and output devices (e.g., keyboard, mouse, touch screen interface, displays, printers, speakers, audio inputs and outputs, video inputs and outputs, microphone jacks, etc.), such as input devices 13, 22, 29 to the computer 550, 560. A network interface 513 allows the computer to connect to various other devices attached to a network (for example the network illustrated at 570 of FIG. 5A). Memory 514 provides volatile storage for computer software instructions 515 and data 516 used to implement some embodiments of the invention.

In an example mobile implementation, a mobile agent implementation of the invention may be provided to interface with input devices 13, 22, 29. A client server environment can be used to enable mobile security services using the server 590. It can use, for example, the XMPP protocol to tether a device authentication engine/agent 515 on the device 550 to a server 560. The server 560 can then issue commands to the mobile phone on request. The mobile user interface framework to access certain components of a system may be based on XHP, Javelin and WURFL. In another example mobile implementation for OS X and iOS operating systems and their respective APIs, Cocoa and Cocoa Touch may be used to implement the client-side components 515 using Objective-C or any other high-level programming language that adds Smalltalk-style messaging to the C programming language.

The system may also include instances of server processes on the server computers 560 that may comprise cloud system, which allow registering a user, selecting switches and input devices 13, 22, 29 and/or the adaptor/device 46 for configuring.

Disk storage 517 provides non-volatile storage for computer software instructions 515 (equivalently "OS program") and data 516 used to implement embodiments of a system. The system may include disk storage accessible to the server computer 560. The server computer can maintain secure access to records related to the authentication of users registered to control the input devices 13, 22, 29 and/or the adaptor/device 46. Central processor unit 512 is also attached to the system bus 510 and provides for the execution of computer instructions.

In an example embodiment, the processor routines 515 and data 516 are computer program products. Aspects of the authentication system 500 may include both server-side and client-side components.

Software implementations 515, 516 may be implemented as a computer readable medium capable of being stored on a storage device 517, which provides at least a portion of the software instructions for input devices 13, 22, 29 and/or adaptor/device 460. Executing instances of respective software components to configure the input devices 13, 22, 29 and/or adaptor/device 460, such as instances of configuration engine, may be implemented as computer program products 515, and can be installed by any suitable software installation procedure, as is well known in the art. In another embodiment, at least a portion of the system software instructions 515 may be downloaded over a cable, communication and/or wireless connection via, for example, a browser SSL session or through an app (whether executed from a mobile or other computing device). In other embodiments, software components 515, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for input devices 13, 22, 29 and/or adaptor/device 46.

Alternate Embodiment without the Signal and Detect 262 of FIG. 2

The device 46 described in relation to FIG. 2 can be particularly applicable to cases wherein the Signal and Detect 262 of FIG. 2 is available as a compact and inexpensive module. In that case, the program can send and receive signals to other devices 46 through the Signal and Detect 262 and the red wall wire 53 so that all lights controlled by devices 46 can be extinguished together from the wall switch 2. With this communication and the special logic in the program, wall switch 2 may transformed into a virtual three-way switch.

However, other embodiments can further address a problem of two (or more) devices on the same wall switch. For example, a case wherein one lamp is on and another lamp on the same wall switch is off may be considered. Without special consideration, each time a user moved the wall switch, one lamp would go on, while the other would go off, endlessly.

A compact, inexpensive signal and detect, such as the Signal and Detect 262, may not be available. As such, signaling between devices on the red house wire during the time the wall switch is open, without being destroyed when 100+ volts show up on the wire, may not always be practical.

Figure 6A:
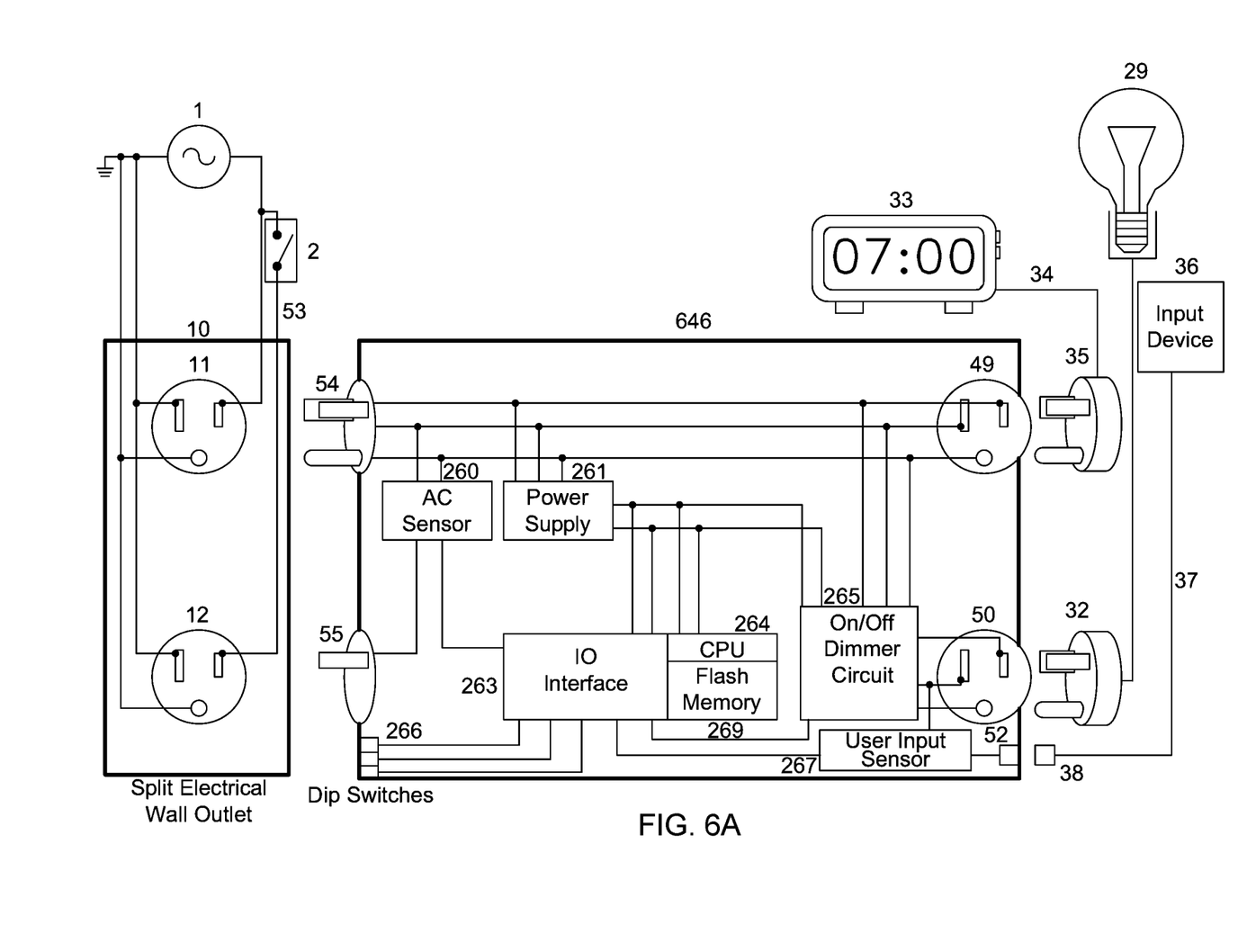
FIG. 6A is a circuit schematic of an example embodiment connecting a lighting device to a split electrical wall outlet, along with an input device for the user to control the lighting device, and not incorporating a Signal and Detect as in the embodiment of FIG. 2.

FIG. 6A illustrates an embodiment device 646. Compared with the device 46 of FIG. 2, the device 646 lacks the Signal and Detect 262. Instead, the device 646 utilizes the bank of three DIP switches 266 and operates as follows. Individual DIP switches in the bank of three DIP switches 266 may be designated DIP Switch 1, DIP Switch 2, and DIP Switch 3. DIP Switch 1 is used as a dim-by-touch setting. DIP Switch 2 is used as a dim-by-wall-switch setting, and DIP Switch 3 is used to indicate whether multiple units are present.

If DIP 3 is on, then DIP 2 is ignored, and there is no dimming from the wall. The C++ code in each device independently tracks the milliseconds since an epoch (e.g., since the last boot time or another arbitrary starting time) for the last time the wall switch was moved. If the wall switch is moved a second time within 500 ms (or another chosen interval) and its light was already off, it does not go back on. Thus, if the user moves the wall switch and the lights alternate, merely moving it again quickly turns them both back off. If the user wants both on, then moving the switch again (after 500 ms) will accomplish this.

In another embodiment, if DIP 3 is set to multiple units then the wall switch behavior changes to be an ON/OFF device. Any units in the room with DIP 3 set can be controlled together upon a change in state of the wall switch. Code is not continuously run in each state of the wall switch being either ON or OFF. Code is run once each time the switch changes state. That occurs because of the ability to detect both the rising and falling edge of the wall switch signal. Dimming and individual touch control remains active during this mode, thus even when the wall switch is OFF, lights can still be turned on by touching them or the touchpad. Multiple units could all be adjusted to different levels, but they all will respond ON or OFF to the wall switch master.

Figure 6B:
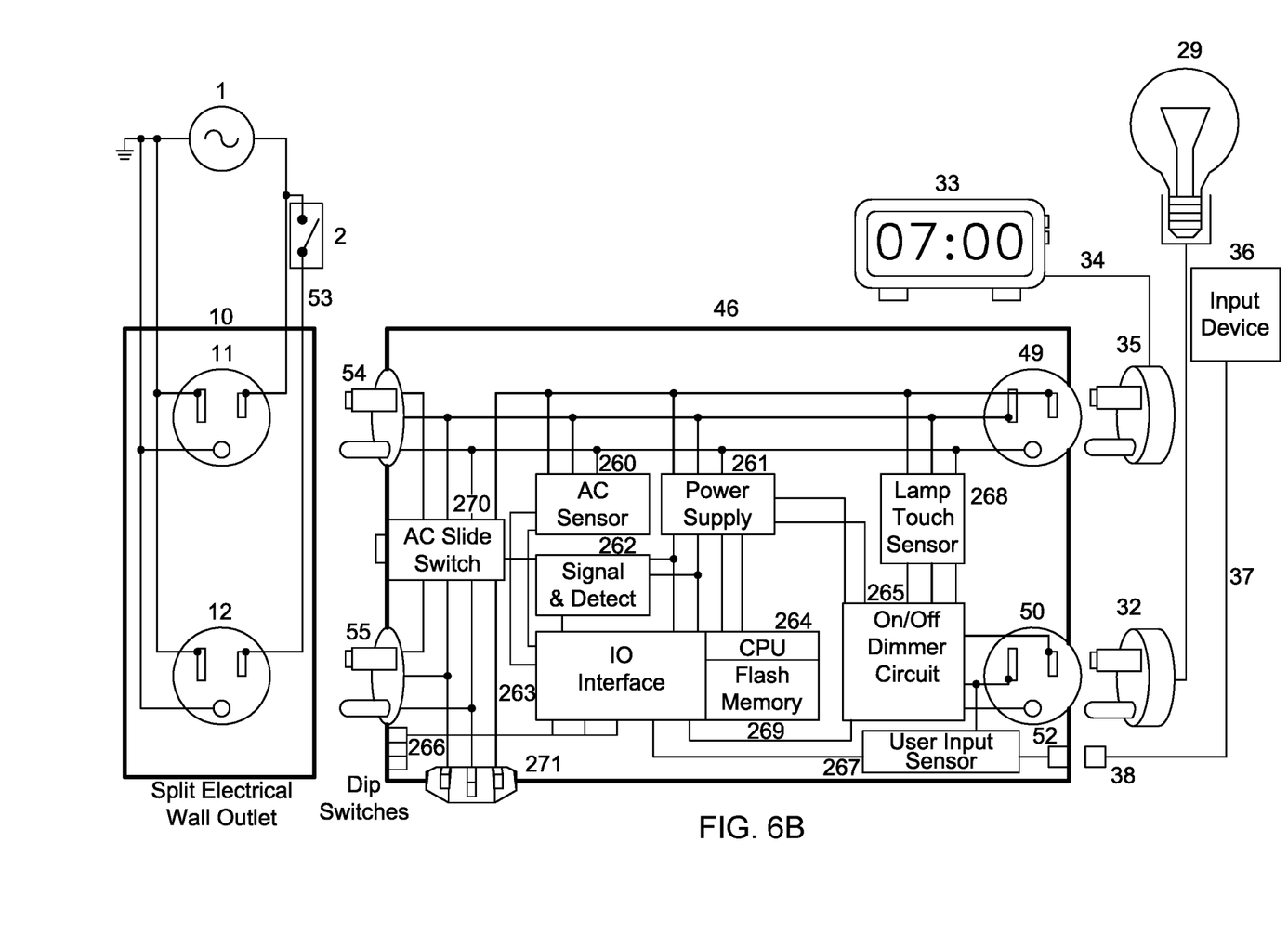
FIG. 6B is a circuit schematic of an example embodiment of FIGS. 2 and 6A incorporating a dim on lamp touch and a separate touchpad connecting a lighting device to a split electrical wall outlet, along with an input device for a user to control the lighting device without the Signal and Detect in the embodiment of FIG. 6B.

FIG. 6B is a circuit schematic of an example embodiment of FIGS. 2 and 6A, respectively, incorporating a dim on lamp touch and a separate touchpad connecting a lighting device to a split electrical wall outlet, along with an input device for a user to control the lighting device without the Signal and Detect in the embodiment of FIG. 6B. A lamp touch sensor 268 to sense user touch on the body of the lamp is provided. At 270, a three-position slide switch is provided for user to select which receptacle is switched, or to utilize outside power. At 271, a C14 power inlet is provided for external power if both receptacles are switched.

In another alternative embodiment, Zwave models can communicate directly and work in a manner such that if any lamp is not at full brightness, moving the wall switch will extinguish none.

While example embodiments have been particularly shown and described, it will be understood by those skilled in the art that various changes in form and details may be made therein without departing from the scope of the embodiments encompassed by the appended claims.

It should be noted, for example, that although reference is made herein-in to "three-way switch", those skilled in the art would understand that solutions provided herein are likewise applicable to "four-way switch". Therefore, the scope of the concept of "three-way switch" should include "four-way switch" herein.

The teachings of all patents, published applications and references cited herein are incorporated by reference in their entirety.

What is claimed is:

1. A virtual three-way switch comprising:
   a power input receiving power from a first power source;
   a state-change sensor detecting a state change of a second power source;
   a user input sensor receiving a user command;
   a first dual in-line package (DIP) switch having two positions for enabling and disabling activation of a first change in a rate of the received power to a rate between no power and full power based on the user command received at the user input sensor;
   a second DIP switch having two positions for enabling and disabling activation of a second change in a rate of the received power to a rate between no power and full power based on the state change of the second power source detected by the state-change sensor; and
   a variable power output delivering the received power at a rate as a function of the state change of the second power source, the user command, the position of the first DIP switch, and the position of the second DIP switch.

2. The virtual three-way switch of claim 1 further including a controller configured to change the rate at which the received power is delivered by the variable power output based upon the function of the state change detected by the state-change sensor, the user command received at the user input sensor, the position of the first DIP switch, and the position of the second DIP switch.

3. The virtual three-way switch of claim 1 further comprising at least one hot output delivering the received power to additional connected devices independent of the rate at which the received power is delivered by the variable power output.

4. The virtual three-way switch of claim 1 wherein the first power source is an always-on wall receptacle and the second power source is a wall receptacle controlled by a wall switch.

5. The virtual three-way switch of claim 4 wherein the rate at which the received power is delivered to the variable power output is responsive to the user command received by the user input sensor when power to the wall receptacle is turned off by the wall switch.

6. The virtual three-way switch of claim 1 wherein the state change is a change in voltage.

7. The virtual three-way switch of claim 1 wherein the user input sensor is configured to receive the user command from a touchpad.

8. The virtual three-way switch of claim 1 wherein the user input sensor receives the user command when a user touches a connected device that is connected to the variable power output.

9. The virtual three-way switch of claim 1 wherein the user input sensor receives one of an audio command and an RF command.

10. The virtual three-way switch of claim 1 wherein the user input sensor receives the user command via Wi-Fi.

11. The virtual three-way switch of claim 1 wherein the rate at which the received power is delivered by the variable power output comprises one of a no power and a full power.

12. The virtual three-way switch of claim 1 further comprising two or more bits of non-volatile state memory to restore the variable power output to a same level as prior to a commercial power failure, in response to the commercial power failure and a restoration.

13. The virtual three-way switch of claim 1 further configured to change settings less than full voltage based on at least one of: (i) a request from a connected device connected to the variable power output via the user input sensor, (ii) a request from the connected device via the user input sensor and a wall switch, or (iii) no request.

14. The virtual three-way switch of claim 1 further comprising at least one USB charger port configured to deliver the received power to attached USB devices.

15. The virtual three-way switch of claim 1 further comprising an always-on power output delivering the received power independent of the state change of the second power source and of the user command.

16. The virtual three-way switch of claim 1 further comprising an AC slide switch having three positions to facilitate selection of the first power source and the second power source based on a user input, wherein the first power source comprises one of an always-on top wall receptacle, an always-on bottom wall receptacle, and an auxiliary power source when neither the top wall receptacle or the bottom wall receptacle is always on.

17. The virtual three-way switch of claim 16, further comprising a power inlet to receive power from the auxiliary power source.

18. The virtual three-way switch of claim 1, further comprising:
a dimmer circuit coupled to the first DIP switch and the second DIP switch, the dimmer circuit being configured to facilitate a dimming cycle including a plurality of dimming stages, and wherein the first change in the rate of the received power includes moving one step in the dimming cycle in response to each user command received at the user input sensor and further wherein the second change in the rate of the received power includes moving one step in the dimming cycle in response to each state change detected by the state-change sensor.

19. A system comprising:
an AC power supply;
a plurality of electrical outlets configured to receive power from the AC power supply, each of the plurality of electrical outlets having at least one receptacle;
a wall switch configured to control AC power supply to the at least one receptacle of each of the plurality of electrical outlets;
a plurality of virtual three-way switches, each being adapted to be connected to a corresponding electrical outlet of the plurality of electrical outlets; and
a plurality of devices, each device being adapted to be connected to a corresponding virtual three-way switch of the plurality of virtual three-way switches to receive variable power output,
wherein each of the plurality of virtual three-way switch including:
a power input configured to receive power from a power source,
a state-change sensor configured to detect a state change of the at least one receptacle of the corresponding electrical outlet, wherein the state-change of the at least one receptacle is associated with a change in positioning of the wall switch,
a user input sensor configured to receive a user command from a corresponding device, and
a variable power output configured to deliver the received power to the corresponding device at a rate as a function of the state change of the at least one receptacle associated with the change in positioning of the wall switch and the user command received from the corresponding device,
wherein the rate of the received power delivered to each of the plurality of the devices in the system is adapted to be independently controlled, using the corresponding virtual three-way switch, based on the state change of the at least one receptacle associated with the change in positioning of the wall switch and the user command received from the corresponding device;
wherein each of the plurality of virtual three-way switches further includes:
a dimmer circuit configured to facilitate a dimming cycle including a plurality of dimming stages in the corresponding device;
a signal and detect unit configured to communicate an indication of a dimming stage of the corresponding device with at least one other virtual three-way switch associated with a second device in the system; and
a controller operatively connected to the dimmer circuit and the signal and detect unit, the controller being configured to:
increase power by one step in the dimming cycle in response to each state change detected by the state-change sensor, until the corresponding device reaches a dimming stage corresponding to a full power;
determine whether the second device is operating at the dimming stage corresponding to the full power when the corresponding device reaches the dimming stage corresponding to the full power; and
move to a diming stage corresponding to a no power in the dimming cycle upon detection of a next state change by the state-change sensor, when the second device is determined to be operating at the dimming stage corresponding to the full power.

20. A system comprising:
an AC power supply;
a plurality of electrical outlets configured to receive power from the AC power supply, each of the plurality of electrical outlets having at least one receptacle;

a wall switch configured to control AC power supply to the at least one receptacle of each of the plurality of electrical outlets;

a plurality of virtual three-way switches, each being adapted to be connected to a corresponding electrical outlet of the plurality of electrical outlets; and a plurality of devices, each device being adapted to be connected to a corresponding virtual three-way switch of the plurality of virtual three-way switches to receive variable power output, wherein each of the plurality of virtual three-way switch includes:
- a power input configured to receive power from a power source,
- a state-change sensor configured to detect a state change of the at least one receptacle of the corresponding electrical outlet, wherein the state-change of the at least one receptacle is associated with a change in positioning of the wall switch,
- a user input sensor configured to receive a user command from a corresponding device, and
- a variable power output configured to deliver the received power to the corresponding device at a rate as a function of the state change of the at least one receptacle associated with the change in positioning of the wall switch and the user command received from the corresponding device, wherein the rate of the received power delivered to each of the plurality of the devices in the system is adapted to be independently controlled, using the corresponding virtual three-way switch, based on the state change of the at least one receptacle associated with the change in positioning of the wall switch and the user command received from the corresponding device;

wherein each of the plurality of virtual three-way switches further includes:
- a DIP switch having two positions configured to enable or disable an indication of a presence or an absence of at least one other virtual three-way switch in the system; and
- a controller operatively connected to the DIP switch, the controller being configured to:
- upon determining that the DIP switch indicates the presence of the at least one other virtual three-way switch:
  - detect, using the state-change sensor, a first state change of the at least one receptacle of the corresponding electrical outlet;
  - change the rate of the received power delivered to the corresponding device when the first state change is detected by the first state change sensor;
  - detect, using the state-change sensor, a second state change of the at least one receptacle of the corresponding electrical outlet within a predetermined time duration from the first state change;
  - determine the rate of the received power delivered to the corresponding device upon detecting the second state change; and
  - change the rate of the received power delivered to the corresponding device to a no power when the determined rate of the received power delivered to the corresponding device corresponds to a full power.

* * * * *